Feb. 15, 1927.
E. G. PATTON
1,617,346
ADJUSTABLE SAFETY STEEL TREAD
Filed Jan. 12, 1926
2 Sheets-Sheet 1
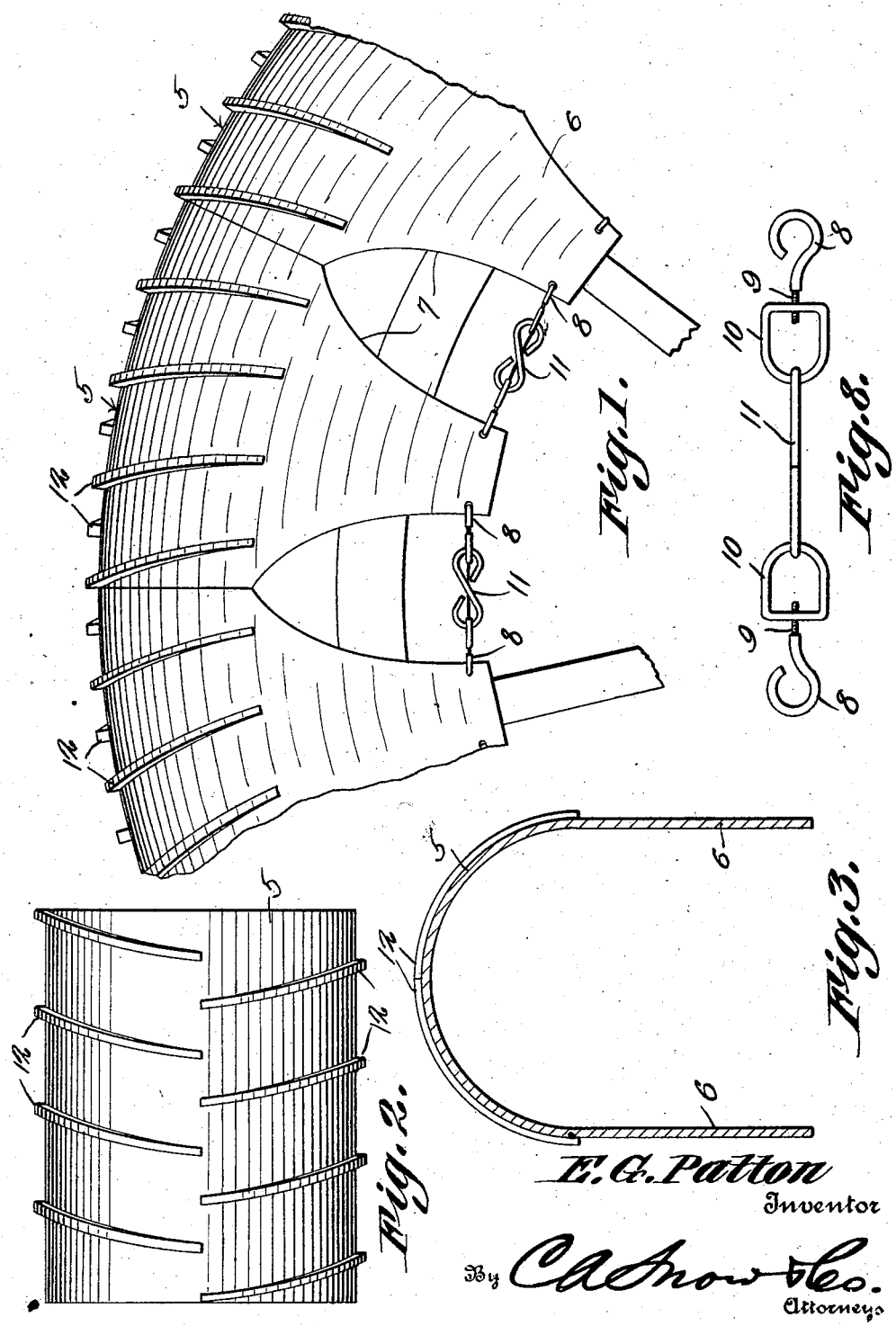

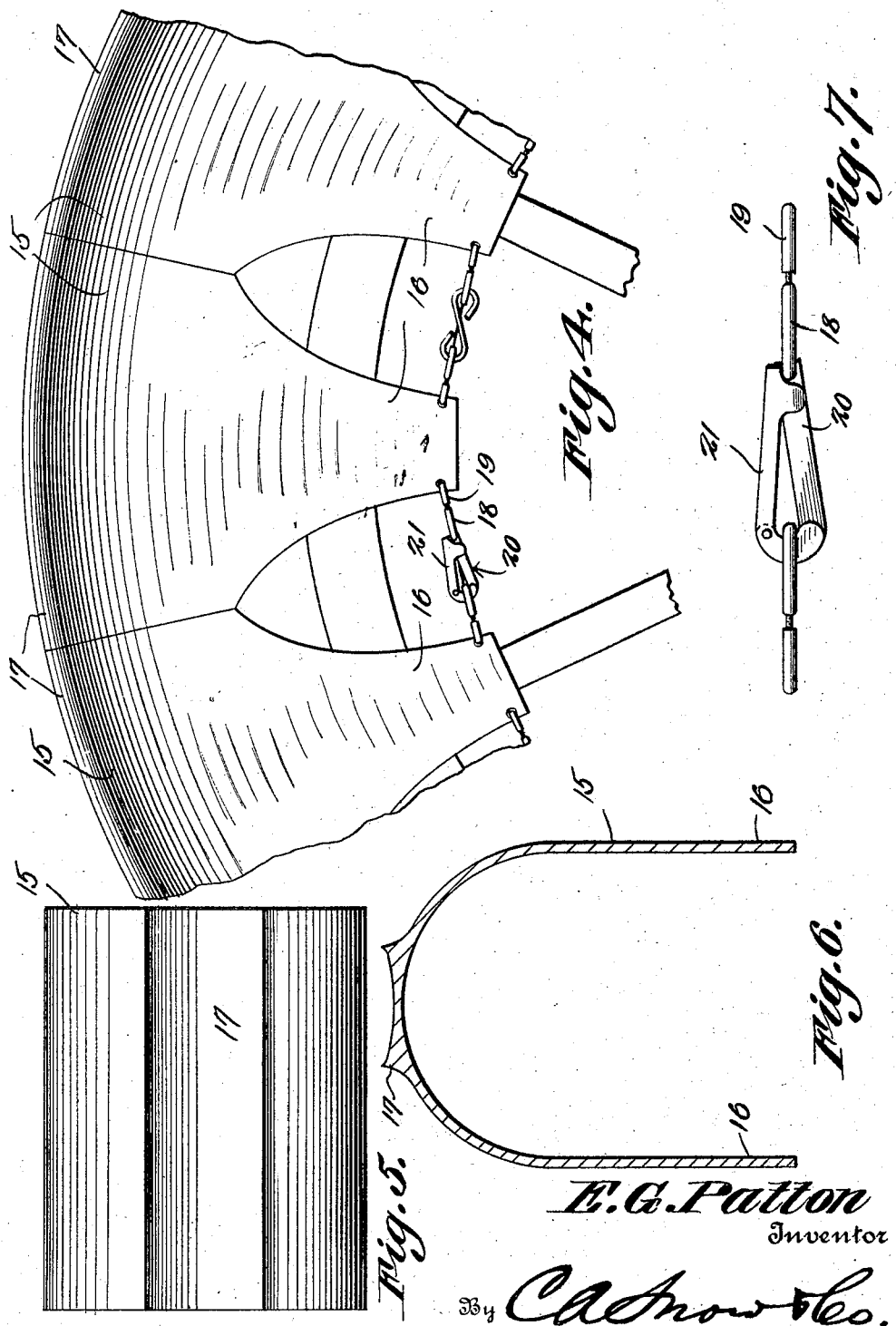

Patented Feb. 15, 1927.

1,617,346

UNITED STATES PATENT OFFICE.

ESHELMAN GRANT PATTON, OF NORRISTOWN, PENNSYLVANIA.

ADJUSTABLE SAFETY STEEL TREAD.

Application filed January 12, 1926. Serial No. 80,811.

This invention relates to a combined safety tread and tire armor and aims to provide a device of this character embodying a plurality of plates, the plates being connected by adjustable means constructed to draw the plates into close engagement with the tire on which they are positioned.

Another important object of the invention is to provide tread plates formed with transversely extended ribs for use on the rear or drive wheels of the motor vehicle to increase traction.

A still further object of the invention is to provide plates having concaved tread portions defining lateral ribs to bite into a snowy or icy surface and insure against lateral movement of the wheels, to facilitate the steering of the vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a fragmental elevational view illustrating a device constructed in accordance with the invention for use on the drive wheels of a vehicle.

Figure 2 is a plan view of one of the tread plates.

Figure 3 is a transverse sectional view through one of the tread plates.

Figure 4 is a fragmental elevational view illustrating tread plates constructed for use on the front wheels of a vehicle.

Figure 5 is a plan view of one of the sections.

Figure 6 is a transverse sectional view through one of the plates used on a front wheel.

Figure 7 is a view illustrating the locking means for locking the plates to a tire.

Figure 8 is a view illustrating the adjustable means for holding tread plates together.

Referring to the drawings in detail, the device includes a plurality of connected tread plates indicated generally by the reference character 5, each of which includes arms 6, which arms have their side edges cut away throughout portions of their lengths as at 7, to provide clearances between the arms and permit of movement of one tread section with respect to its adjacent tread section.

These members 5 are curved as clearly shown by Figure 3 so that they will conform to the curvature of the tire on which they are positioned to insure against undue wear between the tread plates and tire.

Openings are formed in the arms 6 at points adjacent to their outer ends, which openings accomodate the hooks 8 that are formed with threaded portions 9 fitted in threaded openings of the link members 10, there being provided substantially S-shaped link members 11 connected with the link members 10 to hold the link members together.

From the foregoing it will be obvious that these link members 11 present substantially flat side surfaces which may be engaged by a tool such as pliers or the like and rotated in such a way as to cause the arms 6 of adjacent tread plates to be drawn towards each other in a manner to secure them to the tire.

In order to increase traction of the wheels on which the device is positioned, ribs 12 are provided, which ribs are extended at oblique angles with respect to the inner edges of the tread plates and disposed in staggered relation with respect to each other as shown by Figure 2.

In the modified form of the invention as illustrated by Sheet 2 of the drawings, the tread plates are indicated at 15 and are also provided with arms indicated at 16 which arms are connected by a link construction identical with that shown by Figure 8 of the drawings. In this form of the invention, the tread portion of each plate is concaved as shown by Figure 6 defining spaced ribs 17 which are designed to bite into the snow or icy surface over which the vehicle is moving to insure the proper steering of the vehicle it being understood that the tread plates as shown by Sheet 2 are especially designed for use on the front or guiding wheels of the vehicle.

In order that the device may be readily removed from a wheel, adjustable links indicated at 18 are provided which have threaded openings to receive the threaded portions of the hooks 19 that pass through certain openings of adjacent plates. Associated with the links 18 is a clasp 20 that includes a pivoted arm 21 that may be swung to an open position readily.

Thus it will be obvious that the tread plates when connected in a manner as shown and described, will provide a steel housing for the tire on which they are positioned, protecting the tire and at the same time adding efficiency to the vehicle by increasing the traction qualities of the drive wheels.

I claim:—

A tire armor including a plurality of tread sections, said tread sections having cut away portions defining arms, means for connecting the arms of the sections, said connecting means including hook members adapted to be hooked onto the arms, said hook members having threaded extremities, link members having threaded openings to receive the threaded extremities, and a connecting link adapted to pass through the first mentioned link members to secure the first mentioned link members together.

In testimony that I claim the foregoing as my own, I have hereto affixed my signature.

ESHELMAN GRANT PATTON.